US012565401B2

(12) United States Patent
Guo et al.

(10) Patent No.: US 12,565,401 B2
(45) Date of Patent: Mar. 3, 2026

(54) ELEVATOR SWITCH MONITORING DEVICE

(71) Applicant: OTIS ELEVATOR COMPANY, Farmington, CT (US)

(72) Inventors: Ben Guo, West Hartford, CT (US); Zhenhong Li, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1433 days.

(21) Appl. No.: 17/163,944

(22) Filed: Feb. 1, 2021

(65) Prior Publication Data

US 2022/0242692 A1 Aug. 4, 2022

(51) Int. Cl.
*B66B 1/46* (2006.01)

(52) U.S. Cl.
CPC .............. *B66B 1/462* (2013.01); *B66B 1/463* (2013.01)

(58) Field of Classification Search
CPC ................................ B66B 1/462; B66B 1/463
USPC .......................................................... 187/395
See application file for complete search history.

(56) References Cited

U.S. PATENT DOCUMENTS

| | | | | |
|---|---|---|---|---|
| 2009/0223746 | A1* | 9/2009 | Takahashi | B66D 5/08 187/247 |
| 2010/0044159 | A1* | 2/2010 | Okamoto | B66B 5/02 187/288 |
| 2012/0182024 | A1* | 7/2012 | Ike | G01R 31/52 324/509 |
| 2013/0242671 | A1* | 9/2013 | Missiroli | G11C 16/30 365/185.25 |
| 2014/0076666 | A1* | 3/2014 | Yen | B66B 1/302 187/247 |
| 2015/0137751 | A1* | 5/2015 | King | B60L 50/51 320/109 |
| 2015/0346282 | A1* | 12/2015 | Jeon | G01R 31/3278 324/418 |
| 2018/0208432 | A1* | 7/2018 | Yamada | B66B 5/0031 |
| 2019/0363713 | A1* | 11/2019 | Tanaka | H03K 17/687 |
| 2021/0310828 | A1* | 10/2021 | Tutat | H01F 7/08 |
| 2022/0242692 | A1* | 8/2022 | Guo | B66B 1/462 |
| 2025/0083901 | A1* | 3/2025 | Zhu | B66B 5/0037 |

* cited by examiner

*Primary Examiner* — Christina M Schreiber
(74) *Attorney, Agent, or Firm* — Carlson, Gaskey & Olds, P.C.

(57) ABSTRACT

An illustrative example embodiment of a switch monitoring device includes a controller configured to command a switch to enter at least one of a conducting state and a non-conducting state. A monitoring circuit conducts current when the switch is in the conducting state. A comparator provides an output indicating a relationship between a voltage of a selected portion of the monitoring circuit and a threshold voltage. The controller determines a condition of the switch based on the output of the comparator and the command.

22 Claims, 2 Drawing Sheets

ELEVATOR SWITCH MONITORING DEVICE

BACKGROUND

Elevator systems include a variety of electrically powered components. For example, the machine responsible for controlling the movement and position of the elevator car includes a motor and a brake. The motor requires power to move the elevator car and the brake requires power to be lifted or disengaged. Switches control whether the motor or brake are connected to a power supply.

Elevator systems also typically include a daisy chain arrangement of safety switches along a hoistway that are associated with an elevator door component such as a hoistway door lock. Whenever the door component is not in a properly closed position, the corresponding safety switch remains open and interrupts a conductive path along the safety chain. Under these conditions, power is not provided to the elevator machine so that the elevator car cannot move. The safety chain therefore provides an ability to prevent elevator car movement in the event that a hoistway door is not closed or properly locked.

The proper operation of such switches is important for satisfying elevator code requirements. One approach to meeting that goal has been to include special contactors but those tend to be bulky, noisy and expensive. It would be beneficial to have an alternative way to ensure proper switch operation without such drawbacks.

SUMMARY

An illustrative example embodiment of a switch monitoring device includes a controller configured to command a switch to enter at least one of a conducting state and a non-conducting state. A monitoring circuit conducts current when the switch is in the conducting state. A comparator provides an output indicating a relationship between a voltage of a selected portion of the monitoring circuit and a threshold voltage. The controller determines a condition of the switch based on the output of the comparator and the command.

In addition to one or more of the features described above, or as an alternative, the relationship between the voltage of the selected portion of the monitoring circuit and the threshold voltage indicates whether the switch is in the conducting state or the non-conducting state; the controller determines whether a current state of the switch corresponds to the command; and the controller provides an indication that the switch is not functioning properly when the current state of the switch does not correspond to the command.

In addition to one or more of the features described above, or as an alternative, the comparator output has a first value when the voltage of the selected portion of the monitoring circuit exceeds the threshold voltage; the comparator output has a second value when the voltage of the selected portion of the monitoring circuit equals or is below the threshold voltage; the first value indicates that the switch is in the non-conducting state; and the second value indicates that the switch is in the conducting state.

In addition to one or more of the features described above, or as an alternative, an elevator system component comprising the switch and the switch monitoring device of any of the previous paragraphs.

In addition to one or more of the features described above, or as an alternative, the component is a brake including a coil and the switch establishes a connection between the brake and a power supply for energizing the coil when the switch is in the conducting state.

In addition to one or more of the features described above, or as an alternative, the component is a daisy chain including a plurality of switches.

An illustrative example embodiment of a method of monitoring a switch, includes using a controller to command the switch to enter at least one of a conducting state and a non-conducting state, conducting current through a monitoring circuit when the switch is in the conducting state, determining a relationship between a voltage of a selected portion of the monitoring circuit and a threshold voltage, and using the controller to determine a condition of the switch based on the determined relationship and the command.

In addition to one or more of the features described above, or as an alternative, the determined relationship indicates whether the switch is in the conducting state or the non-conducting state, the controller determines whether a current state of the switch corresponds to the command, and the method includes using the controller to provide an indication that the switch is not functioning properly when the current state of the switch does not correspond to the command.

In addition to one or more of the features described above, or as an alternative, determining the relationship comprises using a comparator that compares the voltage of the selected portion of the monitoring circuit and the threshold voltage, the comparator output has a first value when the voltage of the selected portion of the monitoring circuit exceeds the threshold voltage, the comparator output has a second value when the voltage of the selected portion of the monitoring circuit equals or is below the threshold voltage, the first value indicates that the switch is in the non-conducting state, and the second value indicates that the switch is in the conducting state.

In addition to one or more of the features described above, or as an alternative, the switch is part of an elevator system component.

In addition to one or more of the features described above, or as an alternative, the elevator system component is a brake including a coil and the switch establishes a connection between the brake and a power supply for energizing the coil when the switch is in the conducting state.

In addition to one or more of the features described above, or as an alternative, the elevator system component is a daisy chain including a plurality of switches.

The various features and advantages of at least one disclosed example embodiment will become apparent to those skilled in the art from the following detailed description. The drawings that accompany the detailed description can be briefly described as follows.

DETAILED DESCRIPTION

Figure 1:
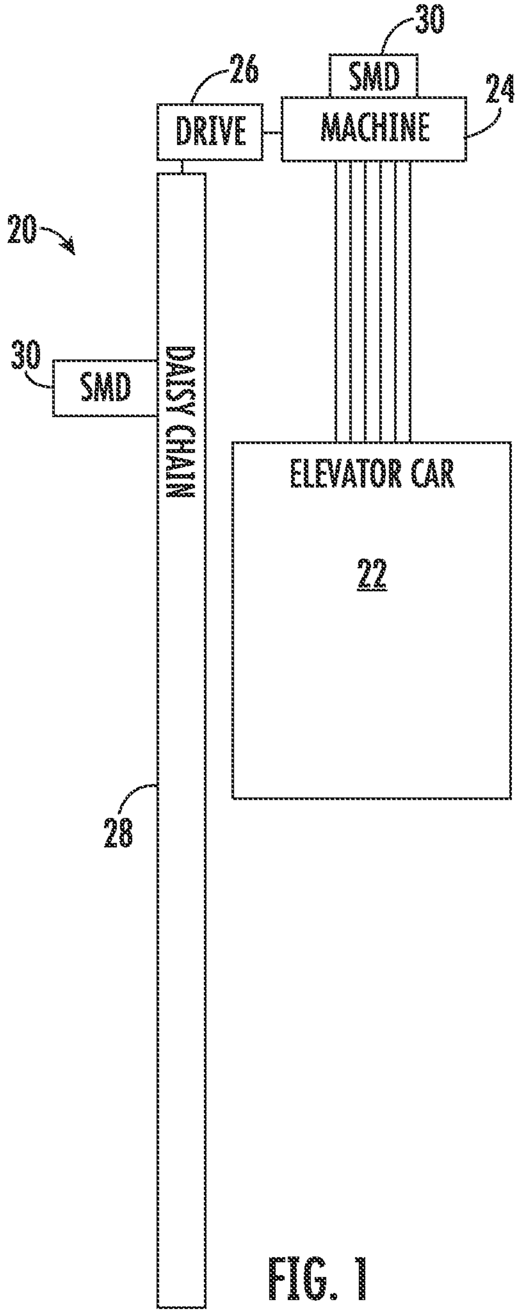
FIG. 1 schematically illustrates selected portions of an elevator system including switch monitoring devices designed according to an example embodiment.

FIG. 1 schematically illustrates selected portions of an elevator system 20. An elevator car 22 is situated to provide elevator service among several landings along a hoistway. A machine 24 includes a motor and brake and controls the movement and position of the elevator car 22. A drive 26 controls power to the machine 24 to achieve the desired position and movement of the elevator car 22. Machine 24 has associated switches that can disconnect the motor or brake from power under selected circumstances, which are known to those skilled in the art.

FIG. 1 also schematically shows a daisy chain 28 that extends along the hoistway. The daisy chain 28 includes a plurality of switches that operate in a known manner to interrupt power to the drive 26 whenever a door at a corresponding landing is not properly closed or locked.

Switch monitoring devices 30 are associated with at least some of the switches in the elevator system 20. Each switch monitoring device provides an output that indicates whether a monitored switch or set of switches is operating properly.

Figure 2:
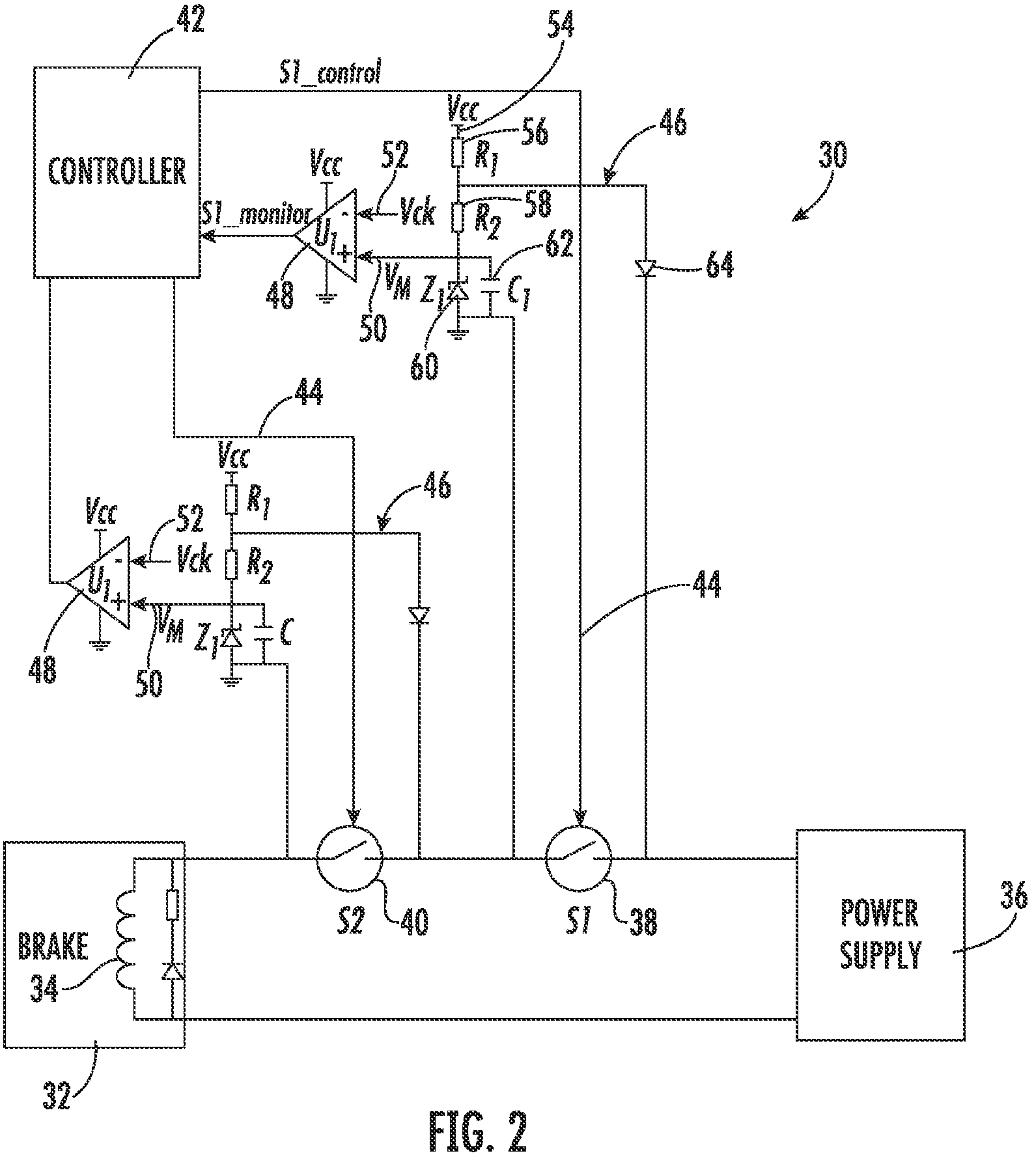
FIG. 2 schematically illustrates an example embodiment of switch monitoring device used with an elevator component that includes control switches.

FIG. 2 schematically illustrates an example embodiment of a switch monitoring device 30 associated with the brake 32 of the elevator machine 24. The brake 32 includes a coil 34 that operates to lift of disengage the brake 32 when the coil 34 is energized by a power supply 36. Switches 38 and 40 are provided to control whether the brake 32 is lifted or engaged depending on the status of the elevator system 20.

The switch monitoring device 30 in this example embodiment is configured to monitor both of the switches 38 and 40. The switch monitoring device 30 includes a controller 42 that selectively issues command signals over a signal lead 44 to command a selected switch 38, 40 to open or close. When the switches 38, 40 are open, they are in a non-conducting state and when they are closed, the are in a conducting state.

The switch monitoring device 30 includes a monitoring circuit 46 for each monitored switch 38, 40. The monitoring circuit 46 effectively monitors a voltage drop across the associated switch 38, 40 when the switch is in the conducting state. A comparator 48 provides an output to the controller 42 that indicates a relationship between a voltage of a selected portion of the monitoring circuit 46 at 50 and a threshold voltage at 52. The voltage at 50 has a first value in a first range when the corresponding switch is in the conducting state and a second, different value in a second range when the corresponding switch is in the non-conducting state. The monitoring circuit 46 includes a voltage source 54, resistors 56 and 58, a Zener diode 60 and a capacitor 62 to control the value of the voltage at 50.

In the example embodiment, when the corresponding switch 38, 40 is in the conducting state, the value of the voltage at 50 drops as current flows through the switch and the remainder of the monitoring circuit 46. When the corresponding switch 38, 40 is open or in the non-conducting state, the preselected values of the components 54-62 control the voltage value at 50. The resistors 56 and 58 serve a current limiting function. The Zener diode 60 limits the voltage at 50 when the corresponding switch 38, 40 is open. The capacitor 62 filters out transient voltage oscillations during a state transition of the associated switch. In the illustrated example embodiment, that voltage value is higher than the threshold voltage at 52 when the corresponding switch 38, 40 is open.

A diode 64 controls the direction of current flow in the monitoring circuit 46 and prevents current flowing from the power supply 36 that might otherwise affect the voltage at 50 when the corresponding switch 38, 40 is open.

In this example embodiment, the output of the comparator 48 has a first value when the corresponding switch 38, 40 is closed or in the conducting state and a second, different value when the corresponding switch 38, 40 is open or in the non-conducting state. For example, the output of the comparator is either a logical 1 or 0, depending on the current state of the corresponding switch 38, 40.

The controller 42 determines whether the current state of each switch 38, 40 corresponds to an expected state based on the command provided by the controller 42. If a switch 38, 40 is commanded to be open and the output of the corresponding comparator 48 indicates that the switch is closed, the controller 42 determines that there is a fault condition or malfunction of the corresponding switch. The controller 42 provides an indication of the fault condition so the switch can be serviced or replaced if necessary. In some examples, an indication of a fault condition causes a shut down of at least part of the elevator system 20 under appropriate circumstances. The indication of the fault condition from the controller 42 may be provided to an elevator system controller, the drive 26, a remote monitoring facility, or a combination of these.

When the comparator output indicates a switch state that corresponds to the commanded switch state, the controller 42 may provide an indication of the health or proper operation of the switch.

Switch monitoring devices consistent with this description can provide information regarding a condition or operational functionality of a switch without interrupting the operation of other switches associated with an elevator system component or other switches in the elevator system 20. Each switch can be tested individually. The switch monitoring device 30 is useful for monitoring a variety of switch types, such as semiconductor switches or mechanical relays.

The switch monitoring devices consistent with this description can provide economic advantages. For example, the ability to monitor a switch as described above allows for using less robust and less expensive switches. Additionally, switches that are smaller and quieter may be selected in place of bulkier or noisier switches. Multiple switches can be monitored with the switch monitoring device 30, which simplifies testing procedures and reduces associated costs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A switch monitoring device, comprising:

a controller configured to issue a command for a switch to enter at least one of a conducting state and a non-conducting state;

a monitoring circuit configured to conduct current when the switch is in the conducting state; and a comparator configured to provide an output indicating a relationship between a voltage of a selected portion of the monitoring circuit and a threshold voltage;

wherein the controller determines a condition of the switch based on the output of the comparator and the command.

2. The switch monitoring device of claim 1, wherein the relationship between the voltage of the selected portion of the monitoring circuit and the threshold voltage indicates whether the switch is in the conducting state or the non-conducting state;

the controller determines whether a current state of the switch corresponds to the command; and the controller provides an indication that the switch is not functioning properly when the current state of the switch does not correspond to the command.

3. The switch monitoring device of claim 1, wherein the output from the comparator has a first value when the voltage of the selected portion of the monitoring circuit exceeds the threshold voltage;

the output from the comparator has a second value when the voltage of the selected portion of the monitoring circuit equals or is below the threshold voltage;

the first value indicates that the switch is in the non-conducting state; and the second value indicates that the switch is in the conducting state.

4. An elevator system component comprising the switch and the switch monitoring device of claim 1.

5. The elevator system component of claim 4, wherein the elevator system component is a brake including a coil and the switch establishes a connection between the brake and a power supply for energizing the coil when the switch is in the conducting state.

6. The elevator system component of claim 4, wherein the elevator system component is a daisy chain including a plurality of switches.

7. The switch monitoring device of claim 1, wherein the output of the comparator has a first value when the switch is closed or in the conducting state and a second, different value when the switch is open or in the non-conducting state.

8. The switch monitoring device of claim 1, wherein:

the controller determines whether a current state of the switch corresponds to an expected state based on the command provided by the controller, and if the switch is commanded to be open and the output of the comparator indicates that the switch is closed, the controller determines that there is a fault condition or malfunction of the switch; and/or when the output of the comparator indicates a switch state that corresponds to a commanded switch state, the controller provides an indication of a health or proper operation of the switch.

9. The switch monitoring device of claim 1, wherein:

the switch monitoring device is associated with a brake of an elevator machine, and wherein the brake includes a coil energized by a power supply and that operates to lift or engage the brake;

the switch comprises a first switch and including a second switch, wherein the first switch and second switch are provided to control whether the brake is lifted or engaged depending on the command; and the first switch and second switch are provided in series to establish a connection between the brake and the power supply for energizing the coil when the first switch and the second switch are in the conducting state.

10. The switch monitoring device of claim 9, wherein the monitoring circuit comprises a first monitoring circuit for the first switch and a second monitoring circuit for the second switch, wherein the first monitoring circuit and the second monitoring circuit each include a comparator that has a voltage source, resistors, a Zener diode, and a capacitor.

11. The switch monitoring device of claim 10, wherein, when one of the first switch or the second switch is open or in the non-conducting state, the resistors of the first monitoring circuit or the second monitoring circuit serve a current limiting function, the Zener diode limits the voltage at the selected portion of a respective one of the first monitoring circuit and the second monitoring circuit when the one of the first switch or the second switch is open, and a respective capacitor of the first monitoring circuit or the second monitoring circuit filters out transient voltage oscillations during a state transition of the one of the first switch or the second switch, and wherein a voltage value is higher at the selected portion of the respective one of the first monitoring circuit and the second monitoring circuit than the threshold voltage when the one of the first switch or the second switch is open.

12. A method of monitoring a switch, the method comprising:

using a controller to issue a command for the switch to enter at least one of a conducting state and a non-conducting state;

conducting current through a monitoring circuit when the switch is in the conducting state;

determining a relationship between a voltage of a selected portion of the monitoring circuit and a threshold voltage; and using the controller to determine a condition of the switch based on a determined relationship and the command.

13. The method of claim 12, wherein the determined relationship indicates whether the switch is in the conducting state or the non-conducting state;

the controller determines whether a current state of the switch corresponds to the command; and the method includes using the controller to provide an indication that the switch is not functioning properly when the current state of the switch does not correspond to the command.

14. The method of claim 12, wherein determining the relationship comprises using a comparator that compares the voltage of the selected portion of the monitoring circuit and the threshold voltage;

a comparator output has a first value when the voltage of the selected portion of the monitoring circuit exceeds the threshold voltage;

the comparator output has a second value when the voltage of the selected portion of the monitoring circuit equals or is below the threshold voltage;

the first value indicates that the switch is in the non-conducting state; and the second value indicates that the switch is in the conducting state.

15. The method of claim 12, wherein the switch is part of an elevator system component.

16. The method of claim 15, wherein the elevator system component is a brake including a coil and the switch establishes a connection between the brake and a power supply for energizing the coil when the switch is in the conducting state.

17. The method of claim 15, wherein the elevator system component is a daisy chain including a plurality of switches.

18. The method of claim 12, wherein determining the relationship comprises using a comparator that compares the voltage of the selected portion of the monitoring circuit and the threshold voltage, and wherein a comparator output has a first value when the switch is closed or in the conducting state and a second, different value when the switch is open or in the non-conducting state.

19. The method of claim 12, wherein determining the relationship comprises using a comparator that compares the voltage of the selected portion of the monitoring circuit and the threshold voltage, and including:

determining whether a current state of the switch corresponds to an expected state based on the command provided by the controller, and if the switch is commanded to be open and a comparator output indicates that the switch is closed, then there is an unexpected state and a fault condition or malfunction of the switch is identified; and/or when the comparator output indicates a switch state that corresponds to a commanded switch state, providing an indication of a health or proper operation of the switch.

20. The method of claim 12, wherein the monitoring circuit is associated with a brake of an elevator machine, and wherein the brake includes a coil energized by a power supply and that operates to lift or engage the brake, and wherein the switch comprises a first switch and including a second switch, wherein the first switch and second switch are provided to control whether the brake is lifted or engaged depending on the command; and wherein the brake includes a coil and the first switch and the second switch establish a connection between the brake and a power supply for energizing the coil when the first switch and the second switch are in the conducting state.

21. The method of claim 20, wherein the monitoring circuit comprises a first monitoring circuit for the first switch a second monitoring circuit for the second switch, wherein the first monitoring circuit and the second monitoring circuit each include a a comparator that includes a voltage source, resistors, a Zener diode, and a capacitor.

22. The method of claim 21, wherein, when one of the first switch or the second switch is open or in the non-conducting state, respective resistors of the first monitoring circuit or the second monitoring circuit serve a current limiting function, the Zener diode limits the voltage at the selected portion of a respective one of the first monitoring circuit and the second monitoring circuit when the one of the first switch or the second switch is open, and a respective capacitor of the first monitoring circuit or the second monitoring circuit filters out transient voltage oscillations during a state transition of the one of the first switch or the second switch, and wherein a voltage value is higher at the selected portion of the respective one of the first monitoring circuit and the second monitoring circuit than the threshold voltage when the one of the first switch or the second switch is open.

* * * * *